INVENTOR.
Nat Cordis

Nov. 25, 1958   N. CORDIS   2,861,685
LITTER REMOVER FOR AUTOMATIC POULTRY FEEDER
Filed May 24, 1954   3 Sheets-Sheet 2

INVENTOR.
Nat Cordis
BY
Everett A. Johnson
ATTORNEY

Nov. 25, 1958     N. CORDIS     2,861,685
LITTER REMOVER FOR AUTOMATIC POULTRY FEEDER
Filed May 24, 1954     3 Sheets-Sheet 3

INVENTOR.
Nat Cordis
BY
*Everett A. Johnson*
ATTORNEY

United States Patent Office 2,861,685
Patented Nov. 25, 1958

2,861,685

LITTER REMOVER FOR AUTOMATIC POULTRY FEEDER

Nat Cordis, Silver Lake, Wis.

Application May 24, 1954, Serial No. 431,728

5 Claims. (Cl. 209—98)

This invention relates to a poultry feeding apparatus of the type wherein an endless flexible conveyor moves feed from a feed supplying means such as a hopper into and along one or more open-topped feeding troughs so as to be available to poultry.

One of the objects of the invention is to provide means at a suitable point along the path of the conveyor for separating debris and litter from the feed in the trough so that it cannot be carried thereby and recirculated along the troughs. Another object is to provide a system which is inexpensive, rugged, and adaptable to troughs of various types and sizes. Other objects of the invention will become apparent as the description of my invention proceeds.

In the drawings I have shown in some detail a preferred embodiment of the invention wherein.

Figure 1:
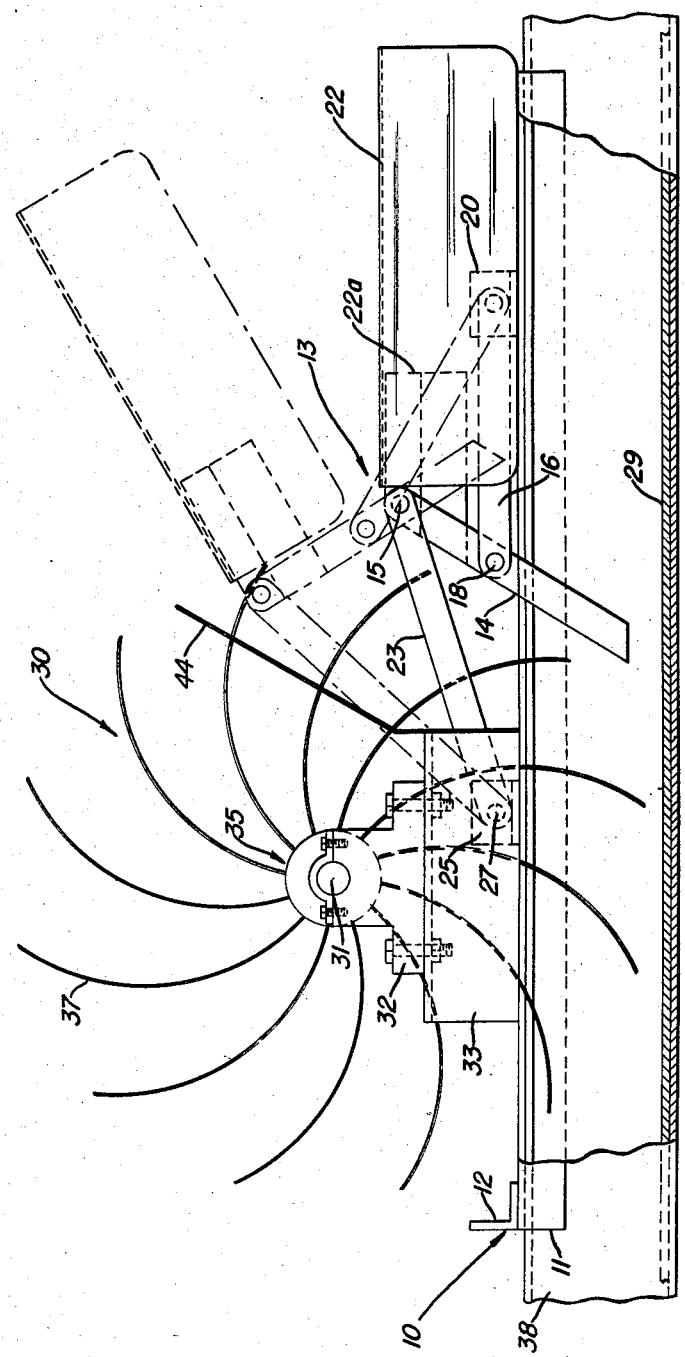
Figure 1 is an elevation of the apparatus partly in section.

Briefly I have attained the objects of my invention by providing an ejector mechanism astride the trough in which the flexible conveyor such as a chain or tape is caused to travel. A rake means is disposed within the trough transverse to the direction of travel of the flexible conveyor and is adapted to catch the debris and litter which is being circulated with the conveyed feed. A litter ejector is rotated above the trough bottom immediately adjacent the rake means, the ejector comprising a hub with a plurality of flexible curved spokes or fingers which are capable of reaching beyond the rake means to impel the litter upwardly and forwardly in the direction of travel of the conveyor. A "turtle-back" shield or deflector is disposed across the trough immediately adjacent the top of the rake means. The ejected litter falls upon the shield and due to the outward and downward slope of the shield the litter falls on either side of the trough and hence is not recirculated with the feed.

Referring to the drawings, the frame 10 is composed of side members 11 and cross members 12. The rake means 13 is composed of a plurality of slats or tines 14 which are movably fixed at their upper ends to the shaft 15. A pair of levers 16 and 17 are pivoted at 18 and 19 to the outermost tines 14 and at the other ends pivoted to blocks 20 and 21 carried by the side frame members 11. The deflector or shield 22 is supported by brackets 22a fixed at one end to the rake assembly 13.

The shaft 27 in the rake assembly 13 is linked by a second pair of levers 23 and 24 which are pivoted to blocks 25 and 26 on the side frame members 11. By the action of the levers 16 and 17 the rake means 13 and shield 22 are permitted to rise to the dashed position shown in Figure 1. Thus any obstruction encountered will not permit the conveyor 29 to stall within the trough 38.

The rotary ejector or brush 30 is carried on drive shaft 31 which is supported in journals 32 fixed to the brackets 33 and 34 on the side frame members 11. The shaft 31 is rotated by a suitable motor 39. The rotated ejector 30 includes a hub 35 which may be composed of a plurality of interlocking annular members 36, each provided with a multiplicity of curved flexible fingers or spokes 37. A suitable material for the spokes 37 is piano wire which is rigid enough to eject litter such as feathers, corn cobs, and the like and yet flexible enough to give a flipping action to the debris so as to impel it upwardly and forwardly to the turtle-back shield 22.

Figure 2:
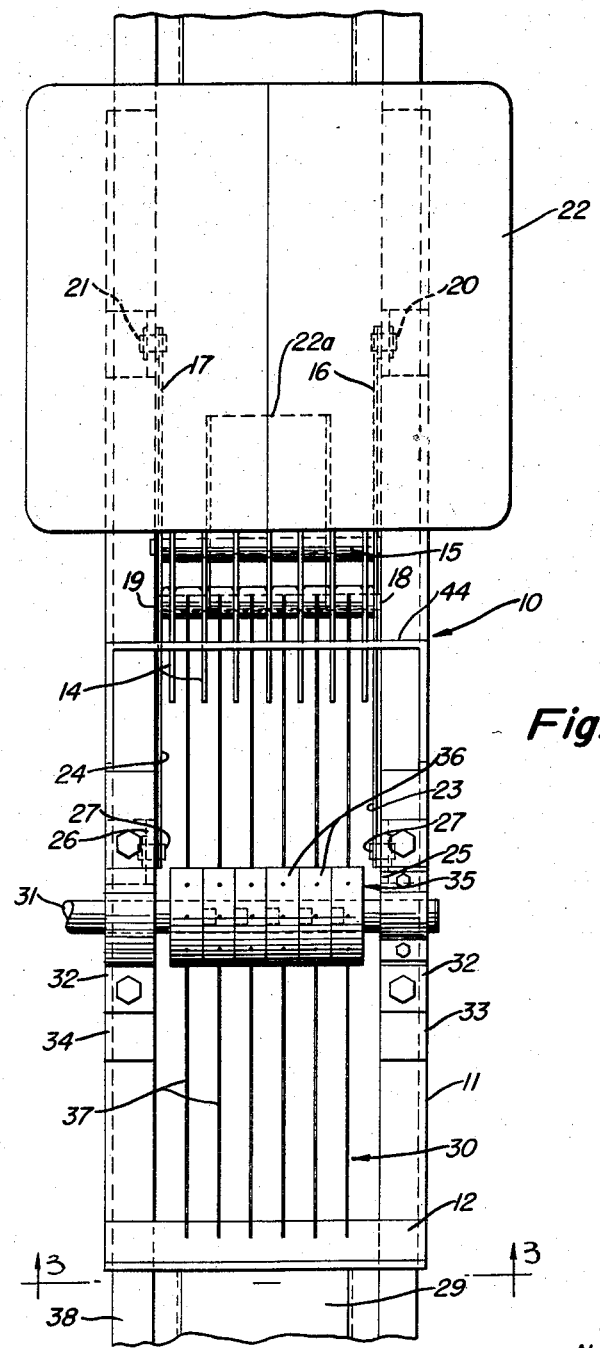
Figure 2 is a plan view thereof.
Figure 3:
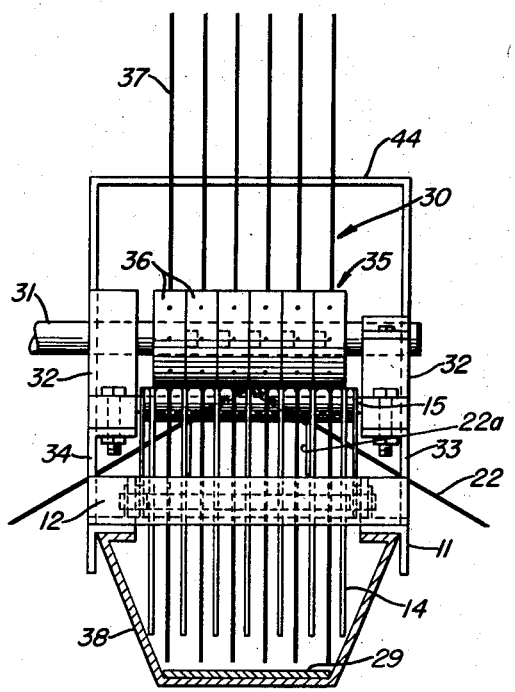
Figure 3 is a section taken along the line 3—3 on Figure 2.
Figure 4:
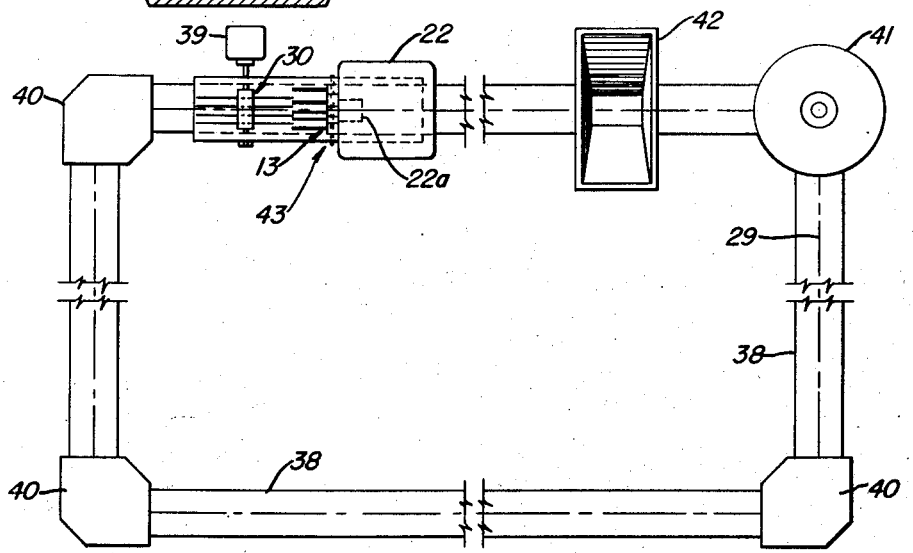
Figure 4 is a schematic illustration of the litter remover associated with a stock feeder.

Referring to Figure 4, the apparatus 43 of Figures 1, 2, and 3 is shown in position on a stock feeder of the closed circuit type. This feeder includes a plurality of troughs 38 having an endless conveyor 29 running along said trough. At the corners are direction changing housings 40 and a drive housing 41. A hopper 42 is schematically shown for discharging feed onto the conveyor 29 within the trough 38. Each corner 40 includes an idler (not shown) about which the conveyor 29 is caused to travel. The conveyor 29 is driven through the closed circuit of troughs 38 and through the idler corners 40 by means of the drive 41. As the conveyor passes beneath the litter remover 43 the operation is as described above.

The conveyor 29 may be of the flat tape type or of the endless link chain type. When a chain is used the idler corners may be provided with sprockets or pulleys which are rotatable in a plane parallel to the bed of the trough 38. The drive unit 41 would in such case contain a drive sprocket engaging the chain.

The tape conveyor may be of several designs and/or constructions. I may for example employ a woven fabric type tape or webbing which may be reinforced with metal strands either as the warp or woof. A very satisfactory tape comprises a thin metal ribbon of a thickness corresponding to "shim stock" and coated with plastic or rubber. If desired the metal ribbon may be embossed or perforated before coating. Another form of tape may be a molded rubber or plastic ribbon reinforced at its margins by embedded metal wires or narrow ribbons.

Whatever the type of webbing used the corners and drives will ordinarily include a plurality of rollers having their axes of rotation in different planes. Examples of such corners and drives are shown in my copending application Serial No. 409,177, filed February 9, 1954, and entitled Continuous Web-Type Poultry Feeder.

Although I have described my invention by reference to a particular embodiment illustrated in the drawings this is by way of illustration only and it should be understood that modifications and additions can be made in my apparatus without departing from the scope of the invention.

What I claim is:

1. In a poultry feeding apparatus the combination of a longitudinally extending feeding trough, an endless flexible conveyor extending through the trough, a litter ejector mechanism disposed astride said trough, said ejector mechanism including a pivoted rake means extending across the said trough and in proximity to said conveyor, a rotated pin wheel means adapted to pass through the tines of the rake means and carry debris therefrom upwardly and forwardly thereof, a deflector shield extending across said trough on the opposite side of said rake means from said rotated pin wheel and adapted to receive and deflect debris from said rake means.

2. In an apparatus for removing litter from circulated feed in an automatic poultry feeder comprising a feeding trough, an endless conveyor which travels within said feeding trough, a feed-passing and debris-retarding means extending across such trough in proximity to said conveyor, a debris-expelling ejector means rotatably mounted adjacent said retarding means, said ejector means having a plurality of flexible fingers extending into said retarding means and adapted to fling the debris forward and upward of said retarding means, and a deflector means across said trough beyond said retarding means to direct the expelled debris from above the trough to a point beyond the lateral edges thereof.

3. The apparatus which comprises a frame member adapted to be set astride a trough upon the flanges thereof, an endless conveyor along said trough, a debris-retarding rake means comprising a plurality of spaced fingers pivotably mounted on said frame and extending across such trough between the flanges thereof with the lower ends of said fingers in proximity to said conveyor, a rotatable pin wheel supported by said frame, said pin wheel comprising a hub with a plurality of resilient fingers extending radially therefrom and between said spaced fingers of said rake, means for rotating said hub at a speed sufficiently great so that the outer ends of said fingers are traveling at a rate greater than the rate of travel of the conveyor within the trough, a deflector plate means fixed to said rake means, and a hinged lever means supporting said rake means on said frame whereby said rake means and said deflector plate may be raised automatically in the event that the conveyor and rake tend to become jammed by an obstruction being conveyed within the trough.

4. An improved litter-ejecting apparatus which includes in combination a feeding trough means, a feed conveyor means operating in said trough means, a bridging deflector shield astride said feeding trough means, a rake means upstream of said deflector having a plurality of tines depending into said trough and terminating adjacent the bottom thereof, a rotatable ejector means comprising a hub with a multiplicity of spring wire fingers extending therefrom, said ejector means being mounted astride said trough upstream of said deflector and with said fingers passing through said rake means whereby debris retarded by said rake means is kicked from the trough by the said fingers onto said deflector and thence diverted permanently from the circulating stream of feed flowing in series below said fork means, through said rake means, and under said deflector means.

5. An apparatus for ejecting debris from an automatic poultry feeder of the type employing an open top trough within which a conveying member travels adjacent the bottom thereof, said mechanism including in combination a conveying member, a debris retarding means arranged transverse of said member, a rotating ejector means astride said conveying member adjacent said retarding means and so located as to engage debris accumulated by the said retarding means, and deflector means shielding a portion of said conveying means and onto which the engaged debris is impelled and from which it falls exterior of the trough within which said conveying member operates.

References Cited in the file of this patent

UNITED STATES PATENTS

| | | |
|---|---|---|
| 653,332 | Aspenwall | July 10, 1900 |
| 1,415,736 | Van Deventer | May 9, 1922 |
| 1,439,699 | Fisk | Dec. 26, 1922 |
| 2,419,898 | Johnson | Apr. 29, 1947 |
| 2,612,264 | West et al. | Sept. 30, 1952 |
| 2,699,253 | Miller | Jan. 11, 1955 |